US012583443B2

(12) United States Patent
Nakashima et al.

(10) Patent No.: US 12,583,443 B2
(45) Date of Patent: Mar. 24, 2026

(54) MOVING BODY CONTROL DEVICE, MOVING BODY CONTROL METHOD, AND MOVING BODY CONTROL PROGRAM

(71) Applicants: HONDA MOTOR CO., LTD., Tokyo (JP); AISIN CORPORATION, Kariya (JP)

(72) Inventors: Hiroyuki Nakashima, Tokyo (JP); Jun Adachi, Kariya (JP); Kazutaka Hayakawa, Kariya (JP)

(73) Assignees: HONDA MOTOR CO., LTD., Tokyo (JP); AISIN CORPORATION, Kariya (JP)

( * ) Notice: Subject to any disclaimer, the term of this patent is extended or adjusted under 35 U.S.C. 154(b) by 170 days.

(21) Appl. No.: 18/491,852

(22) Filed: Oct. 23, 2023

(65) Prior Publication Data

US 2024/0140403 A1 May 2, 2024

(30) Foreign Application Priority Data

Oct. 28, 2022 (JP) ................................ 2022-172982

(51) Int. Cl.
*B60W 30/06* (2006.01)

(52) U.S. Cl.
CPC .................................. *B60W 30/06* (2013.01)

(58) Field of Classification Search
CPC .............. B62D 15/0285; B60W 30/06; B60W 30/18036; B60W 30/18045
See application file for complete search history.

(56) References Cited

U.S. PATENT DOCUMENTS

| | | | | |
|---|---|---|---|---|
| 2019/0220997 | A1 | 7/2019 | Asai et al. | |
| 2020/0242936 | A1 | 7/2020 | Matsunaga et al. | |
| 2020/0339195 | A1* | 10/2020 | Feijoo | G01S 17/89 |
| 2021/0394782 | A1 | 12/2021 | Tagawa et al. | |
| 2022/0299322 | A1 | 9/2022 | Ikeda | |

FOREIGN PATENT DOCUMENTS

| | | | | |
|---|---|---|---|---|
| DE | 10 2013 015 348 | A1 | 4/2014 | |
| EP | 3401190 | A1 * | 11/2018 | B62D 15/0285 |
| JP | 2010-30597 | A | 2/2010 | |
| JP | 2019-132664 | A | 8/2019 | |

(Continued)

OTHER PUBLICATIONS

Translation of EP 3401190 to Zemp (Year: 2018).*
(Continued)

*Primary Examiner* — Kenneth J Malkowski
(74) *Attorney, Agent, or Firm* — Rankin, Hill & Clark LLP

(57) ABSTRACT

A moving body control device includes an outside recognition unit, a reception unit, and a control unit. The control unit is configured to register feature points related to the designated parking position based on the recognition data of the outside as registered feature points, perform the automatic parking control for parking the moving body at the designated parking position based on the recognition data of the outside and the registered feature points, and update the registered feature points according to a match rate between the feature points obtained based on the recognition data of the outside when the automatic parking control is executed and the registered feature points.

9 Claims, 8 Drawing Sheets

(56) References Cited

FOREIGN PATENT DOCUMENTS

| | | | |
|---|---|---|---|
| JP | 2020-34366 | A | 3/2020 |
| JP | 2020-117128 | A | 8/2020 |
| JP | 2022-142826 | A | 10/2022 |

OTHER PUBLICATIONS

English machine translation of Japanese Office Action dated Apr. 1, 2025 issued in corresponding Japanese application No. 2022-172982 (3 pages).
Extended European Search Report dated Apr. 5, 2024, Application No. EP 23205258.9; 10 pages.

* cited by examiner

MOVING BODY CONTROL DEVICE, MOVING BODY CONTROL METHOD, AND MOVING BODY CONTROL PROGRAM

CROSS-REFERENCE TO RELATED APPLICATIONS

This application is based on and claims priority under 35 USC 119 from Japanese Patent Application No. 2022-172982 filed on Oct. 28, 2022.

TECHNICAL FIELD

The present disclosure relates to a moving body control device, a moving body control method, and a moving body control program.

BACKGROUND ART

In recent years, efforts to provide access to sustainable transport systems which consider vulnerable people among transport participants are increasing. To achieve such system, research and development to further improve traffic safety and convenience is focused through research and development on autonomous driving technology.

In the related art, automatic parking control which automatically moves a vehicle to a predetermined parking space which is designated and parks the vehicle has been known. In JP 2020-117128 A, a parking support device is described in which a user performs manual driving and parking of manually driving and parking a vehicle in a predetermined parking space, feature point information related to the surroundings of the vehicle is acquired and stored in a memory during the manual driving and parking, and automatic parking control is performed based on the feature point information. JP 2020-117128 A eventually contributes to the development of sustainable transportation systems.

However, even when a vehicle is parked in the same parking space, there may be a difference in the feature point information related to the surroundings of the vehicle to be acquired, due to, for example, seasonal changes or the passage of time. Therefore, if there is a mismatch between the feature point information stored in the memory and the feature point information when the next automatic parking is executed, the target parking space may not be recognized based on the feature point information, and the automatic parking control may not be possible. However, JP 2020-117128 A does not describe control of the vehicle when feature point information changes due to the seasonal changes or the passage of time. Therefore, improvement is needed in the related art.

SUMMARY OF INVENTION

An object of the present disclosure is to provide a moving body control device, a moving body control method, and a moving body control program capable of continuously and automatically parking a moving body at a designated parking position even when feature points of an outside of the moving body changes.

According to an aspect of the present disclosure, there is provided a moving body control device including an outside recognition unit configured to acquire recognition data of an outside of a moving body, a reception unit configured to receive designation of a predetermined parking position from a user of the moving body, and a control unit configured to perform automatic parking control for parking the moving body at the predetermined parking position based on the recognition data of the outside and the predetermined parking position, and register the predetermined parking position as a designated parking position, in which the control unit is configured to register feature points related to the designated parking position based on the recognition data of the outside as registered feature points, and perform the automatic parking control for parking the moving body at the designated parking position based on the recognition data of the outside and the registered feature points, and update the registered feature points according to a match rate between the feature points obtained based on the recognition data of the outside when the automatic parking control is executed and the registered feature points.

According to another aspect of the present disclosure, there is provided a moving body control method including a processor of a moving body control device, in which the processor of the moving body control device is configured to acquire recognition data of an outside of a moving body, receive designation of a predetermined parking position from a user of the moving body, perform automatic parking control for parking the moving body at the predetermined parking position based on the recognition data of the outside and the predetermined parking position, and register the predetermined parking position as a designated parking position, register feature points related to the designated parking position based on the recognition data of the outside as registered feature points, and perform the automatic parking control for parking the moving body at the designated parking position based on the recognition data of the outside and the registered feature points, and update the registered feature points according to a match rate between the feature points obtained based on the recognition data of the outside when the automatic parking control is executed and the registered feature points.

According to another aspect of the present disclosure, there is provided a moving body control program causing a processor of a moving body control device to execute a process of acquiring recognition data of an outside of a moving body, receiving designation of a predetermined parking position from a user of the moving body, performing automatic parking control for parking the moving body at the predetermined parking position based on the recognition data of the outside and the predetermined parking position, and registering the predetermined parking position as a designated parking position, registering feature points related to the designated parking position based on the recognition data of the outside as registered feature points, and performing the automatic parking control for parking the moving body at the designated parking position based on the recognition data of the outside and the registered feature points, and updating the registered feature points according to a match rate between the feature points obtained based on the recognition data of the outside when the automatic parking control is executed and the registered feature points.

According to the moving body control device, the moving body control method, and the moving body control program of the present disclosure, it is possible to continuously and automatically park a moving body at a designated parking position, even when the feature points of an outside of the moving body changes.

DESCRIPTION OF EMBODIMENTS

Figure 1:
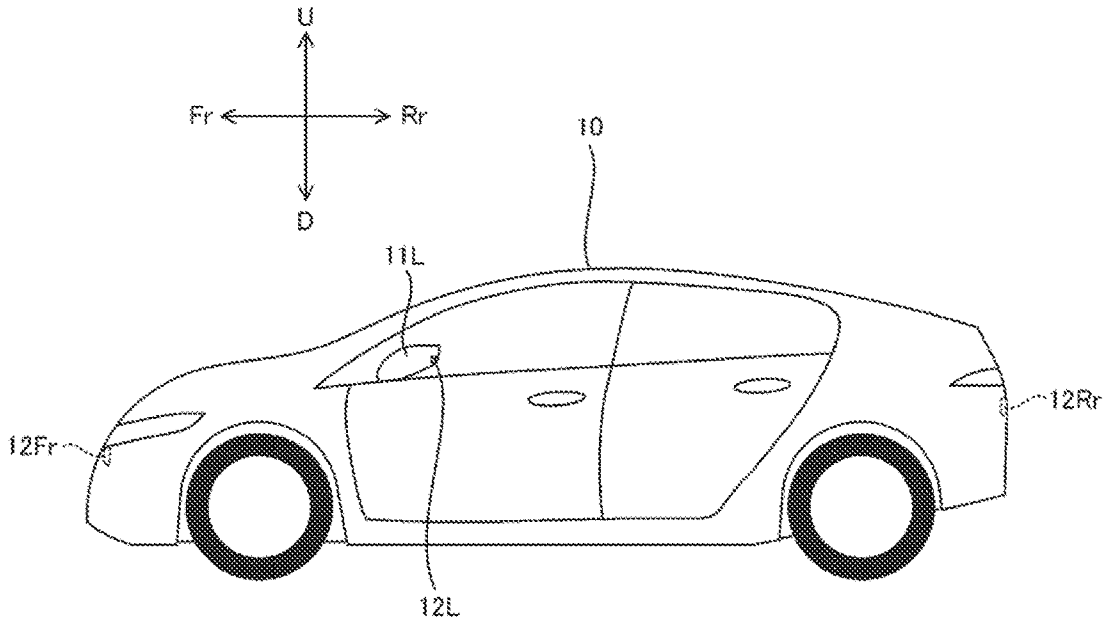
FIG. 1 is a side view illustrating an example of a vehicle equipped with a moving body control device according to the present embodiment.

An embodiment of a moving body control device, a moving body control method, and a moving body control program according to the present disclosure will be described below with reference to the accompanying drawings. The drawings are to be viewed in the direction of the reference numerals. In the specification and the like, for the sake of simplicity and clarity of explanation, front and rear, left and right, and up and down directions are described according to the directions seen from the driver of a vehicle 10 illustrated in FIGS. 1 and 2. In the drawings, Fr denotes the front of the vehicle 10, Rr denotes the rear, L denotes the left, R denotes the right, U denotes the top, and D denotes the bottom.

<Vehicle 10 Equipped with Moving Body Control Device According to Present Disclosure>

Figure 2:
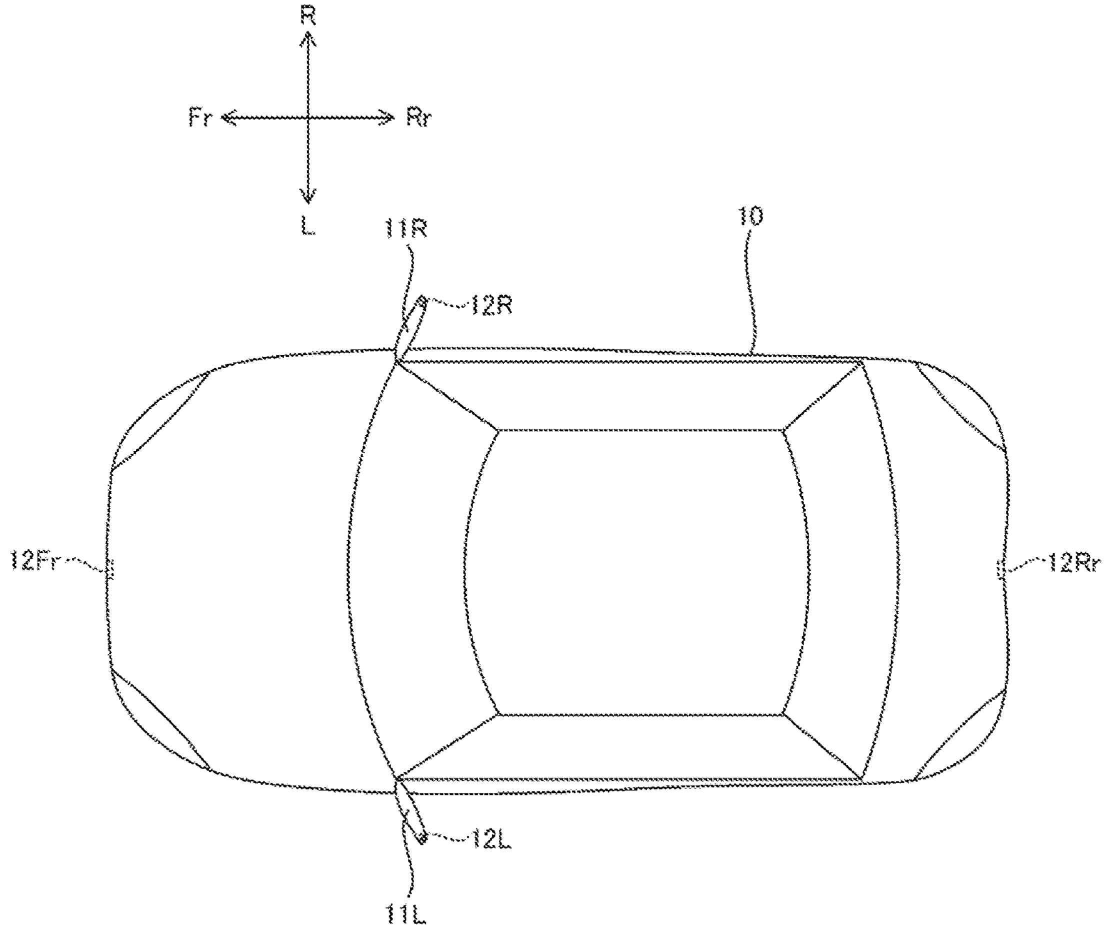
FIG. 2 is a top view of the vehicle illustrated in FIG. 1.

FIG. 1 is a side view of a vehicle 10 equipped with the moving body control device according to the present disclosure. FIG. 2 is a top view of the vehicle 10 illustrated in FIG. 1. The vehicle 10 is an example of a moving body according to the present disclosure.

The vehicle 10 is an automobile which includes a driving source (not illustrated) and wheels including a driving wheel driven by power of the driving source and a steerable steering wheel. In the present embodiment, the vehicle 10 is a four-wheel automobile which includes a pair of left and right front wheels and a pair of left and right rear wheels. The driving source of the vehicle 10 is, for example, an electric motor. The driving source of the vehicle 10 may be an internal combustion engine such as a gasoline engine or a diesel engine, or may be a combination of an electric motor and an internal combustion engine. The driving source of the vehicle 10 may drive the pair of left and right front wheels, may drive the pair of left and right rear wheels, or may drive four wheels of the pair of left and right front wheels and the pair of left and right rear wheels. The front and rear wheels may be both steerable steering wheels or any one thereof may be a steerable steering wheel.

The vehicle 10 further includes side mirrors 11L and 11R. The side mirrors 11L and 11R are mirrors (rearview mirrors) provided in the outside the front doors of the vehicle 10 and used for the driver to check the rear sides and the rear lateral side. The side mirrors 11L and 11R are fixed to the main body of the vehicle 10 by rotating shafts extending in the vertical direction, and can be opened and closed by rotating about the rotating shafts.

The vehicle 10 further includes a front camera 12Fr, a rear camera 12Rr, a left side camera 12L, and a right side camera 12R. The front camera 12Fr is a digital camera which is provided in the front of the vehicle 10 and captures the front side of the vehicle 10. The rear camera 12Rr is a digital camera which is provided in the rear of the vehicle 10 and captures the rear side of the vehicle 10. The left side camera 12L is a digital camera which is provided in the left side mirror 11L of the vehicle 10 and captures the left side of the vehicle 10. The right side camera 12R is a digital camera which is provided in the right side mirror 11R of the vehicle 10 and captures the right side of the vehicle 10. The front camera 12Fr, the rear camera 12Rr, the left side camera 12L, and the right side camera 12R are examples of an outside recognition unit of the present invention.

<Internal Configuration of Vehicle 10>

Figure 3:
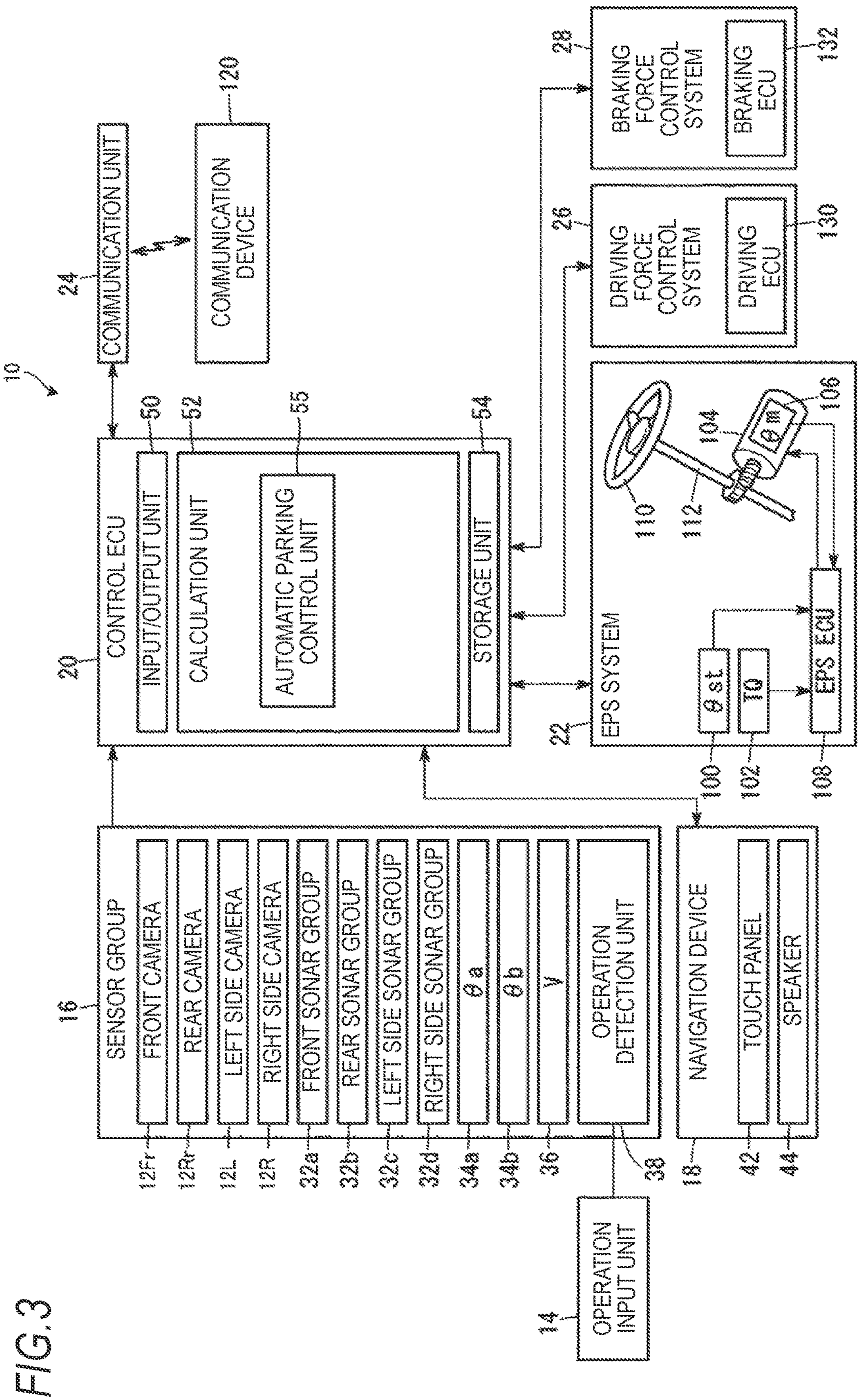
FIG. 3 is a block diagram illustrating the internal configuration of the vehicle illustrated in FIG. 1.

FIG. 3 is a block diagram illustrating an example of the internal configuration of the vehicle 10 illustrated in FIG. 1. As illustrated in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28. An example of the moving body control device according to the present disclosure is configured by the sensor group 16, the navigation device 18, and the control ECU 20.

The sensor group 16 acquires various detected values used for control by the control ECU 20. The sensor group 16 includes the front camera 12Fr, the rear camera 12Rr, the left side camera 12L, and the right side camera 12R. The sensor group 16 includes a front sonar group 32*a*, a rear sonar group 32*b*, a left side sonar group 32*c*, and a right side sonar group 32*d*. The sensor group 16 includes wheel sensors 34*a* and 34*b*, a vehicle speed sensor 36, and an operation detection unit 38.

The front camera 12Fr, the rear camera 12Rr, the left side camera 12L, and the right side camera 12R acquire recognition data (for example, surrounding images) for recognizing the outside of the vehicle 10 by capturing the surroundings of the vehicle 10. The surrounding images captured by the front camera 12Fr, the rear camera 12Rr, the left side camera 12L, and the right side camera 12R are referred to as a front image, a rear image, a left side image, and a right side image, respectively. Images formed by the left side image and the right side image may be also referred to as side images.

The front sonar group 32*a*, the rear sonar group 32*b*, the left side sonar group 32*c*, and the right side sonar group 32*d* emit ultrasonic waves to the surroundings of the vehicle 10 and receive waves reflected from other objects. The front sonar group 32*a* includes, for example, four sonars. The sonars included in the front sonar group 32*a* are respectively provided in diagonally left front, left front, right front, and diagonally right front of the vehicle 10. The rear sonar group 32*b* includes, for example, four sonars. The sonars included in the rear sonar group 32*b* are respectively provided in diagonally left rear, left rear, right rear, and diagonally right rear of the vehicle 10. The left side sonar group 32*c* includes, for example, two sonars. The sonars included in the left side sonar group 32*c* are provided in the left side front and left side rear of the vehicle 10. The right side sonar group 32*d* includes, for example, two sonars. The sonars included in the right side sonar group 32*d* are provided in the right side front and right side rear of the vehicle 10.

The wheel sensors 34*a* and 34*b* detect rotation angles of the wheels of vehicle 10. The wheel sensors 34*a* and 34*b* may be configured with angle sensors or may be configured with displacement sensors. The wheel sensors 34*a* and 34*b* output detection pulses whenever the wheels are rotated by a predetermined angle. The detection pulses output from the wheel sensors 34*a* and 34*b* are used to calculate a rotation angle of the wheels and a rotation speed of the wheels. Based on the rotation angles of the wheels, a movement distance of the vehicle 10 is calculated. The wheel sensor 34*a* detects, for example, a rotation angle θa of the left rear wheel. The wheel sensor 34*b* detects, for example, a rotation angle θb of the right rear wheel.

The vehicle speed sensor 36 detects a speed of the vehicle body of the vehicle 10, that is, a vehicle speed V, and outputs the detected vehicle speed V to the control ECU 20. The vehicle speed sensor 36 detects the vehicle speed V based on, for example, rotation of a countershaft of a transmission.

The operation detection unit 38 detects operation content performed by a user using an operation input unit 14 and outputs the detected operation content to the control ECU 20. The operation input unit 14 includes, for example, various user interfaces such as a side mirror switch switching between opening and closing states of the side mirrors 11L and 11R, and a shift lever (a select lever or a selector).

The navigation device 18 detects a current position of the vehicle 10 using, for example, a global positioning system (GPS), and guides the user along a route to a destination. The navigation device 18 includes a storage device (not illustrated) including map information database.

The navigation device 18 includes a touch panel 42 and a speaker 44. The touch panel 42 functions as an input device and a display device for the control ECU 20. The speaker 44 outputs various types of guide information by a sound to a passenger of the vehicle 10.

The touch panel 42 is configured such that various instructions can be input to the control ECU 20. For example, the user can input an instruction related to parking support of the vehicle 10 via the touch panel 42. The touch panel 42 is configured to display various screens related to the control contents of the control ECU 20. For example, a screen related to the parking support of the vehicle 10 is displayed on the touch panel 42. Specifically, a parking support button for requesting parking support of the vehicle 10 is displayed on the touch panel 42. The parking support button includes an automatic parking button for requesting parking by automatic steering of the control ECU 20 and a parking assistance button for requesting assistance when the driver performs manual parking. Components other than the touch panel 42, such as a smart phone, may be used as an input device or a display device. The touch panel 42 (navigation device 18) and the smart phone are examples of a reception unit of the present invention.

For example, "parking" is a stop which accompanies getting on and off of occupants, and excludes a temporary stop due to a traffic signal or the like. "Parking position" is a position at which the moving body is stopped, that is, parked.

The control ECU 20 includes an input/output unit 50, a calculation unit 52 and a storage unit 54. The calculation unit 52 is configured by, for example, a central processing unit (CPU). The calculation unit 52 performs various controls by controlling each unit based on the programs stored in the storage unit 54. The calculation unit 52 inputs and outputs signals to and from each unit connected to the control ECU 20 via the input/output unit 50.

The calculation unit 52 includes an automatic parking control unit 55 for controlling automatic parking of the vehicle 10. The automatic parking control unit 55 is an example of a control unit of the present invention. The automatic parking control unit 55 assists the parking of the vehicle 10 by automatic steering which automatically operates a steering wheel 110 under the control of the automatic parking control unit 55. In assisting the automatic steering, an accelerator pedal (not illustrated), a brake pedal (not illustrated) and the operation input unit 14 are automatically operated. The automatic parking control unit 55 performs assistant parking support when the driver performs the operations on the accelerator pedal, the brake pedal, and the operation input unit 14 and manually parks the vehicle 10.

For example, the automatic parking control unit 55 performs automatic parking control for parking the vehicle 10 at a designated predetermined parking position based on the recognition data of the outside of the vehicle 10 acquired by the front camera 12Fr, the rear camera 12Rr, the left side camera 12L, and the right side camera 12R, and the predetermined parking position designated by the user.

The automatic parking control unit 55 registers the predetermined parking position designated by the user in the storage unit 54 as the designated parking position. The automatic parking control unit 55 registers, in the storage unit 54, the feature points related to the designated parking position based on the recognition data of the outside of the vehicle 10 acquired by the front camera 12Fr, the rear camera 12Rr, the left side camera 12L, and the right side camera 12R. The automatic parking control unit 55 performs automatic parking control for parking the vehicle 10 at the designated parking position, based on the recognition data of the outside of the vehicle 10 and the registered feature points of the designated parking position designated by the user.

The feature points related to the designated parking position include feature points of the designated parking position itself, feature points of the surroundings of the designated parking position, and the like. Examples of the feature points of the designated parking position itself include a feature point such as a character "parking" displayed within the designated parking position. Examples of the feature points of the surroundings of the designated parking position include characteristic buildings and obstacles existing in the surroundings.

The automatic parking control unit 55 detects a match rate between the feature points obtained based on the recognition data of the outside when the automatic parking is executed and the registered feature points acquired before the execution and being already registered, and updates the registered feature points according to the match rate. The automatic parking control unit 55 does not update the registered feature points, when the match rate between the feature points when automatic parking is executed and the registered feature points is equal to or greater than a first threshold (for example, 80%). The automatic parking control unit 55 updates the registered feature points, when the match rate between the feature points when automatic parking is executed and the registered feature points is less than the first threshold and is equal to or greater than a second threshold (for example, 60%) lower than the first threshold. The automatic parking control unit 55 does not execute automatic parking of the vehicle 10 based on the registered feature points, when the match rate between the feature points when automatic parking is executed and the registered feature points is less than the second threshold. Each numerical value (%) indicating the threshold of the match rate is merely an example numerical value as a guideline.

The EPS system 22 includes a steering angle sensor 100, a torque sensor 102, an EPS motor 104, a resolver 106, and an EPS ECU 108. The steering angle sensor 100 detects a steering angle θst of the steering wheel 110. The torque sensor 102 detects torque TQ applied to the steering wheel 110.

The EPS motor 104 applies driving force or reaction force to a steering column 112 connected to the steering wheel 110, thereby enabling the operation support of the steering wheel 110 by the occupants and the automatic steering at the time of parking support. The resolver 106 detects the rotation angle θm of the EPS motor 104. The EPS ECU 108 controls the entire EPS system 22. The EPS ECU 108 is provided with an input/output unit (not illustrated), a calculation unit (not illustrated), and a storage unit (not illustrated).

The communication unit 24 enables wireless communication with another communication device 120. The other communication device 120 is a base station, a communication device of another vehicle, an information terminal such as a smart phone possessed by a passenger of the vehicle 10, or the like.

The driving force control system 26 includes a driving ECU 130. The driving force control system 26 performs driving force control of the vehicle 10. The driving ECU 130 controls a driving force of the vehicle 10 by controlling an engine (not illustrated) and the like, based on an operation on an accelerator pedal (not illustrated) by the user.

The braking force control system 28 includes a braking ECU 132. The braking force control system 28 performs braking force control of the vehicle 10. The braking ECU 132 controls a braking force of the vehicle 10 by controlling a brake mechanism (not illustrated) or the like, based on an operation on the brake pedal (not illustrated) by the user.

<Automatic Parking Control by Automatic Parking Control Unit 55>

Next, automatic parking control of the vehicle 10 by the automatic parking control unit 55 will be described with reference to FIGS. 4 to 11.

Figure 4:
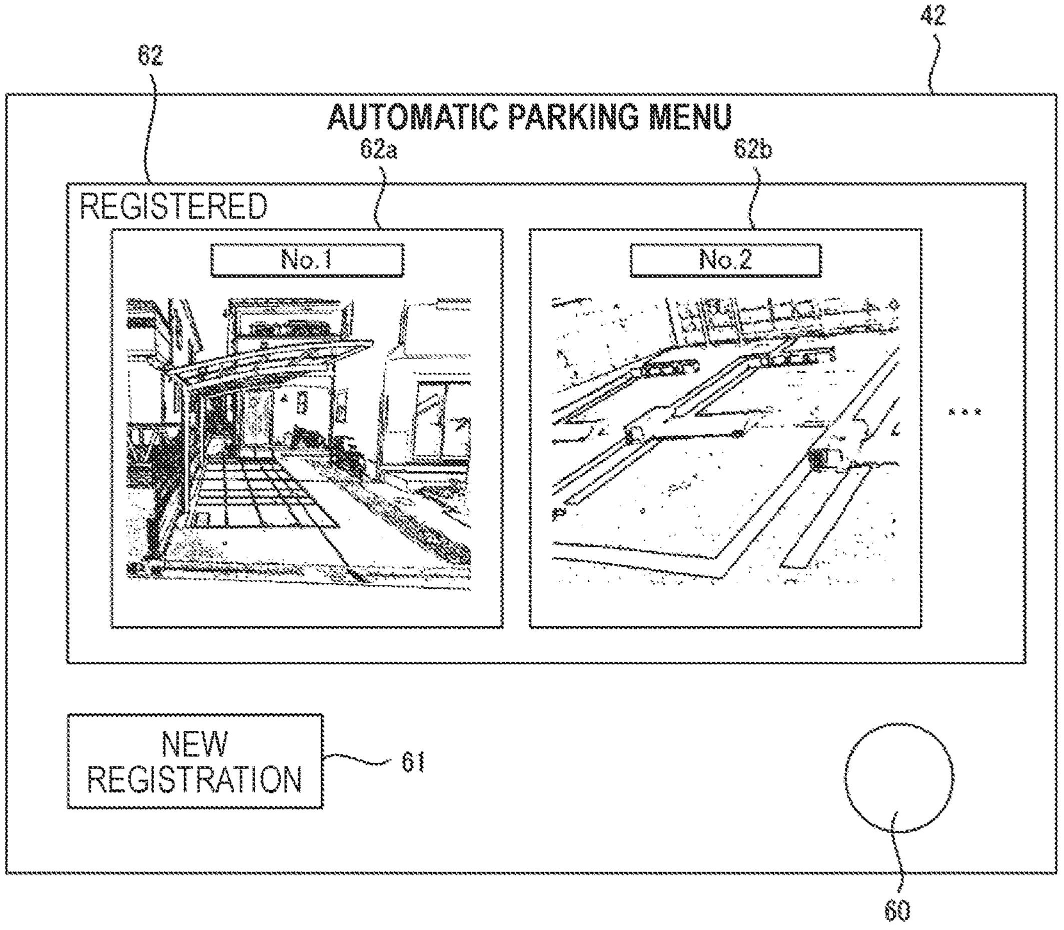
FIG. 4 is a diagram illustrating an example of an image displayed on a navigation device when the vehicle is automatically parked.

FIG. 4 is a diagram illustrating an example of an "automatic parking menu" displayed on the touch panel 42 of the navigation device 18 when the vehicle 10 is automatically parked. The image of the automatic parking menu is displayed by touch-operating an automatic parking button 60 displayed on the touch panel 42. For example, when the user who wants to park the vehicle 10 comes near the parking lot, the user performs a touch operation for the automatic parking button 60 to display the automatic parking menu.

As illustrated in FIG. 4, a new registration button 61 and a registered parking position image button 62 are displayed on the image of the automatic parking menu. The new registration button 61 is a button to be operated when the vehicle 10 is to be parked at a parking position to be newly registered as a designated parking position. The registered parking position image button 62 is a button to be operated when the vehicle 10 is to be parked at a designated parking position which is already registered. Examples of the registered parking position image button 62 include a parking position image button in which a parking lot at home is registered as the designated parking position as illustrated in the No. 1-image button 62*a*, a parking position image button in which a coin parking lot with a high parking frequency is registered as the designated parking position as illustrated in the No. 2-image button 62*b*, or the like. The image displayed on the registered parking position image button 62 is an image captured by, for example, the front camera 12Fr of the vehicle 10 at the time of registration.

[Automatic Parking Control to New Parking Position]

First, the automatic parking control by the automatic parking control unit 55 when the new registration button 61 is operated by touch will be described with reference to FIGS. 5 to 8.

Figure 5:
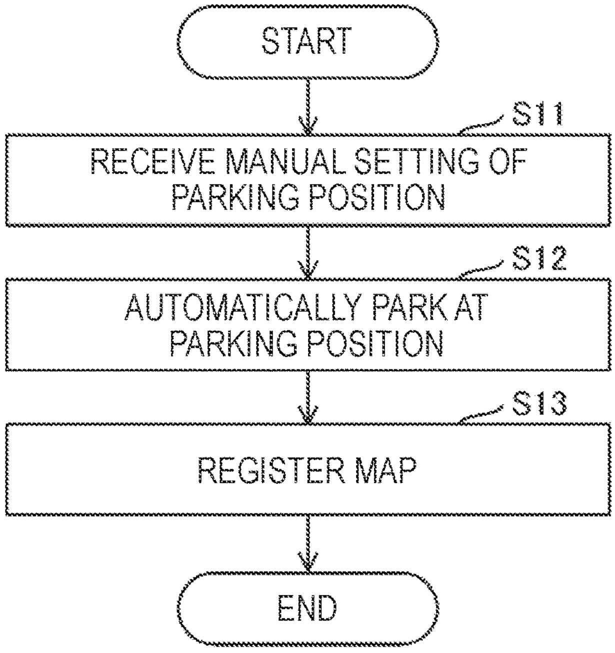
FIG. 5 is a flow chart illustrating automatic parking control for parking the vehicle in a new parking position.
Figure 6:
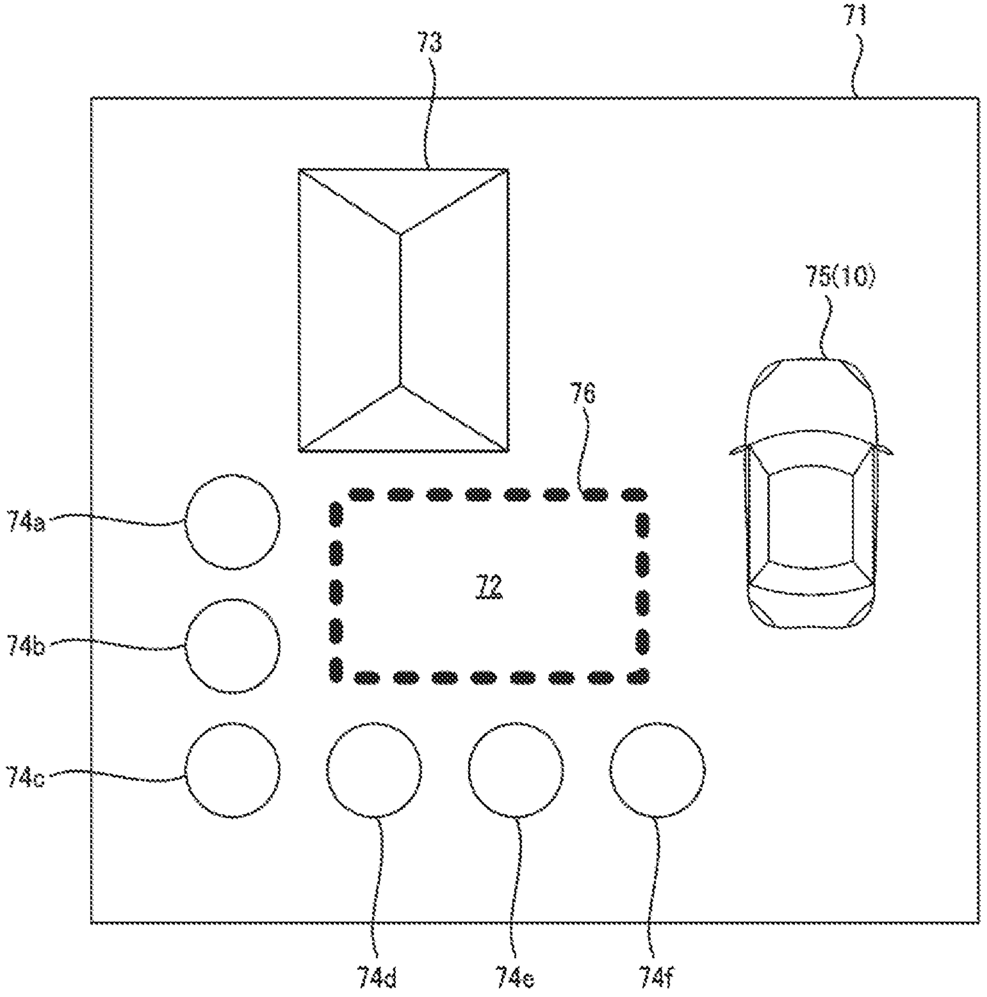
FIG. 6 is a diagram in which a parking position is set in a bird's-eye view image generated based on an image captured by a camera.
Figure 7:
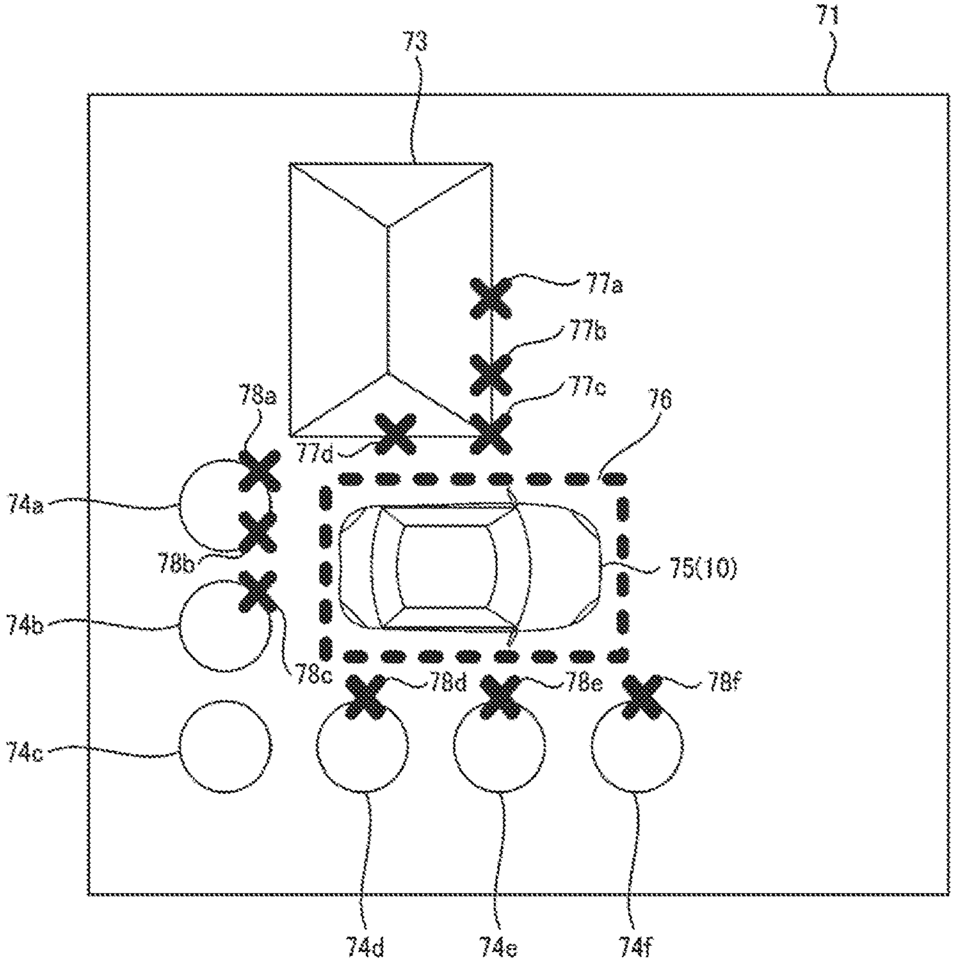
FIG. 7 is a diagram illustrating feature points of the surroundings of the parking position illustrated in FIG. 6.
Figure 8:
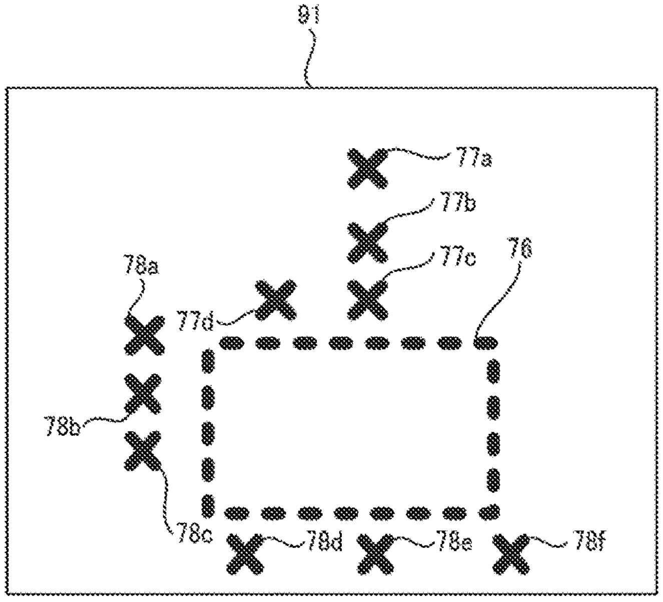
FIG. 8 is a diagram illustrating an example of feature point map registered for the parking position.

FIG. 5 is a flow chart illustrating automatic parking control for parking the vehicle 10 in a new parking position. FIG. 6 is a diagram in which a parking position 76 is set in a bird's-eye view image 71 (composite image) generated from the recognition data of the outside of the vehicle 10 acquired by the front camera 12Fr, the rear camera 12Rr, the left side camera 12L, and the right side camera 12R. FIG. 7 is a diagram illustrating feature points of the surroundings of the parking position 76 illustrated in FIG. 6. FIG. 8 is a diagram illustrating an example of feature point map registered for the parking position. When the new registration button 61 is operated by touch, the automatic parking control unit 55 starts a process illustrated in FIG. 5.

The automatic parking control unit 55 receives manual setting by the driver for setting the parking position of the vehicle 10 (step S11).

For example, the driver of the vehicle 10 stops the vehicle 10 in front of the parking lot at home and touches the new registration button 61 to register the parking lot as a new designated parking position. Then, on the touch panel 42 of the vehicle 10, as illustrated in FIG. 6, the bird's-eye view image 71 generated based on the recognition data on the outside of the vehicle 10 is displayed. The vehicle 10 parked in front of the parking lot 72 at home is illustrated in the bird's-eye view image 71. In the bird's-eye view image 71, a driver's residence (building) 73 and a plurality of plants (obstacles) 74*a* to 74*f* are displayed. The parking lot 72 is provided between the building 73 and the obstacles 74*a* to 74*f*. The vehicle displayed in the bird's-eye view image 71 is an image illustrating the state of the vehicle 10 viewed from above, and is a vehicle image 75 which is generated (captured) in advance and stored in the storage unit 54 or the like. The parking position can be manually set by operating a rectangular parking position 76 indicating the area where the vehicle 10 is to be parked on the touch panel 42 on which the bird's-eye view image 71 is displayed by touch, and sliding the vehicle 10 to the desired parking position.

When the manual setting of the parking position 76 is received in step S11, the automatic parking control unit 55 detects feature points related to the designated parking position 76, from the recognition data of the outside acquired by the front camera 12Fr, the rear camera 12Rr, the left side camera 12L, and the right side camera 12R, and automatically parks the vehicle 10 at the parking position 76 based on the detected feature points (step S12).

For example, as in the bird's-eye view image 71 illustrated in FIG. 7, the automatic parking control unit 55 detects building feature points 77*a* to 77*d* indicating the positions of the outline of the building 73 on the side closer to the parking position 76, obstacle feature points 78*a* to 78*f* indicating positions of the obstacles 74*a* to 74*f* existing around the parking position 76, or the like, as feature points related to the designated parking position 76.

Next, the automatic parking control unit 55 registers a feature point map configured by feature points related to the designated parking position 76 detected in step S12 and the parking position 76 manually set in step S11 as a registered feature point of the designated parking position, in the storage unit 54 (step S13).

The feature point map representing the registered feature points of the designated parking position is, for example, as illustrated in a feature point map 91 illustrated in FIG. 8, registered as a map illustrating a relationship between the building feature points 77*a* to 77*d* and the obstacle feature points 78*a* to 78*f* detected in the bird's-eye view image 71 of FIG. 7 and the parking position 76 manually set.

Thus, the parking position 76 designated by the user is registered in the storage unit 54 as a designated parking position having registered feature points (feature point map), and is displayed in the automatic parking menu as one of the registered parking position image buttons 62.

[Automatic Parking Control to Registered Parking Position]

Next, automatic parking control by the automatic parking control unit 55 when the registered parking position image button 62 is operated by touch will be described with reference to FIGS. 9 to 11.

Figure 9:
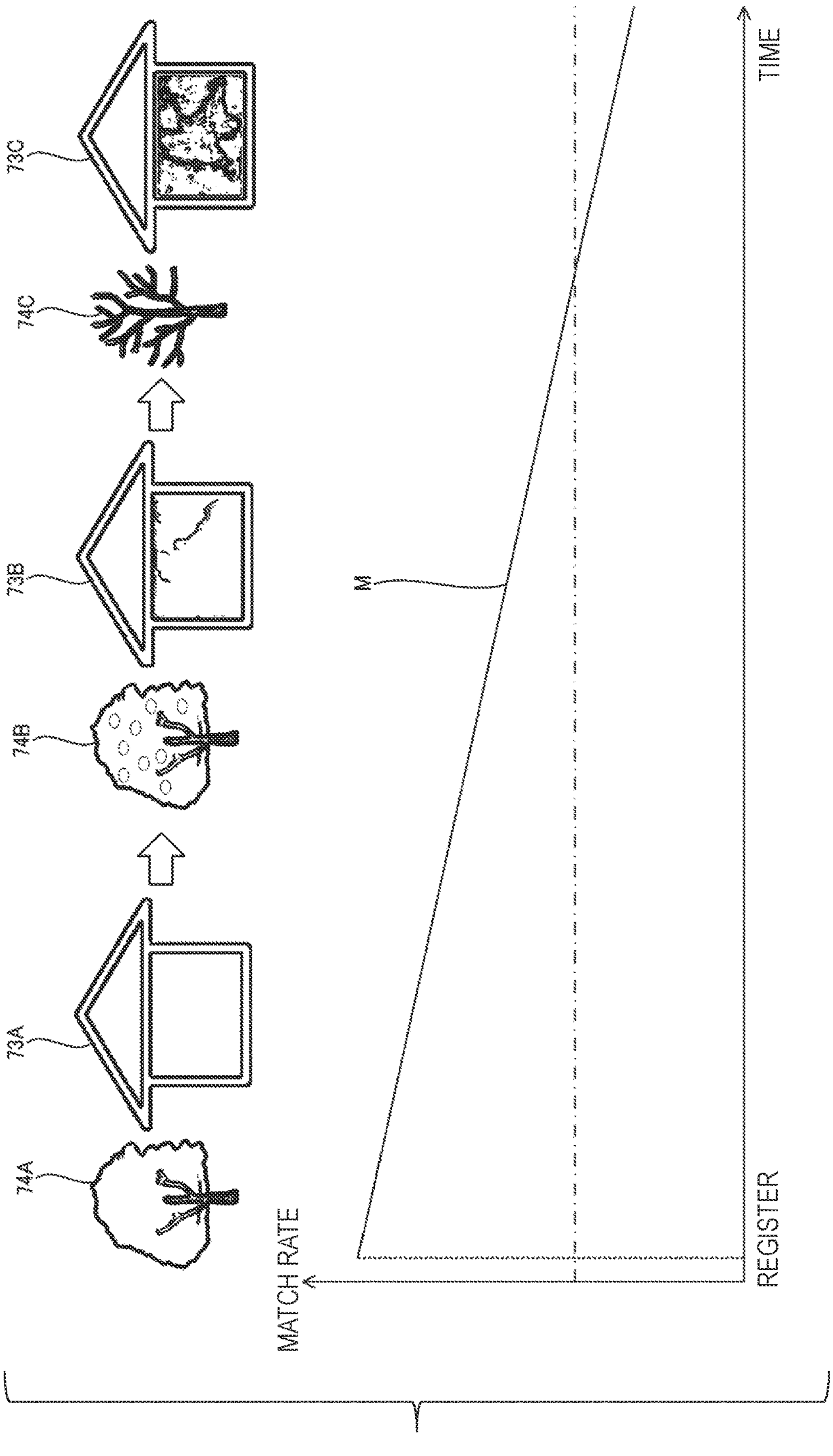
FIG. 9 is a diagram illustrating a match rate between appearances of objects and feature points of the objects which changes over time.

FIG. 9 is a diagram illustrating a match rate between appearance of objects in the surroundings of the parking position and feature points of the objects which change over time. As illustrated in FIG. 9, buildings 73 (73A to 73C) and obstacles 74 (74A to 74C) existing in the outside where the vehicle 10 is parked change in appearance due to deterioration over time and seasonal changes. When the appearance of the building 73 (73A to 73C) and the obstacle 74 (74A to 74C) changes, changes also occur in the recognition data of the outside captured by the front camera 12Fr, the rear camera 12Rr, the left side camera 12L, and the right side camera 12R of the vehicle 10.

Therefore, for example, even when feature points are detected and registered from the recognition data of the building 73A and the planting (obstacle) 74A, when appearance changes such as the building 73B and the planting (obstacle) 74B and further the building 73C and the planting (obstacle) 74C due to passage of time and seasonal changes, the feature points detected from the recognition data thereof also change, and the match rate M of the feature points gradually decreases. Therefore, when the vehicle 10 is parked at the designated parking position, as the feature points of the surroundings of the designated parking position detected from the recognition data change due to the passage of time or seasonal changes, the automatic parking of the vehicle 10 to the designated parking position based on the registered feature points may not be performed accurately.

Therefore, in the automatic parking control by the automatic parking control unit 55 of the present example, when the vehicle 10 is automatically parked at a designated parking position for which the feature points of the parking position are registered, the registered feature points are updated according to the match rate between the feature points related to the designated parking position acquired when executing the automatic parking and the registered feature points.

Figure 10:
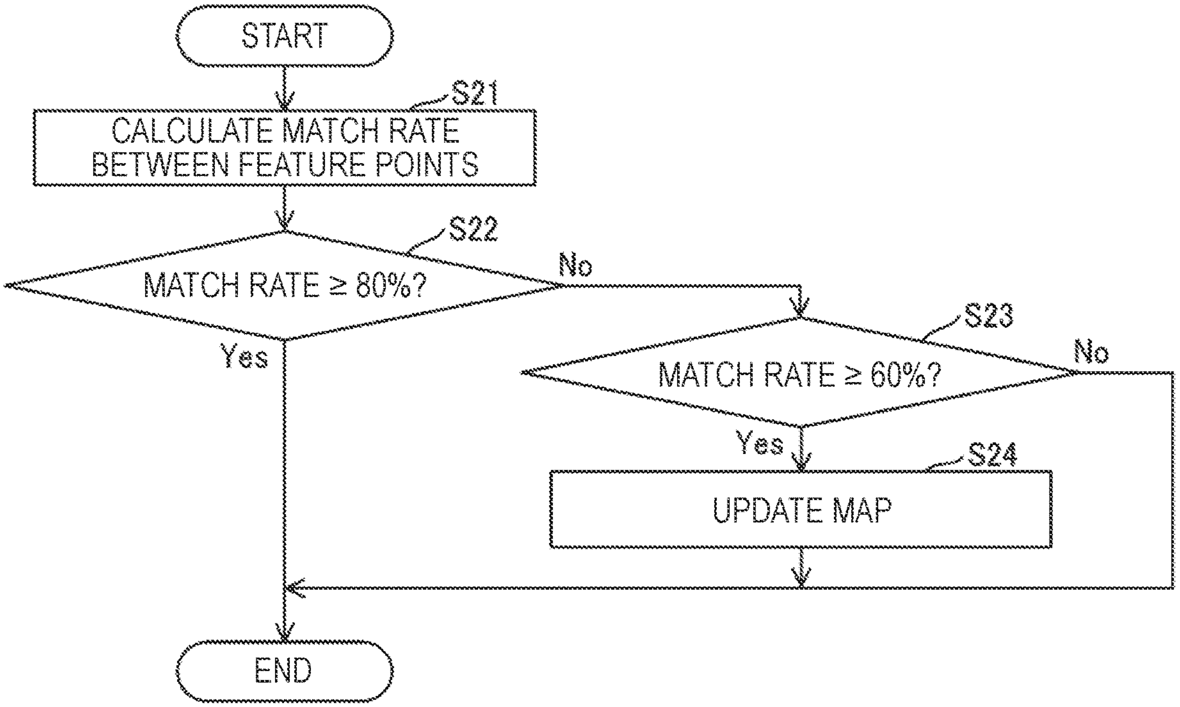
FIG. 10 is a flowchart illustrating an example of a process for updating a feature point map during automatic parking control.
Figure 11:
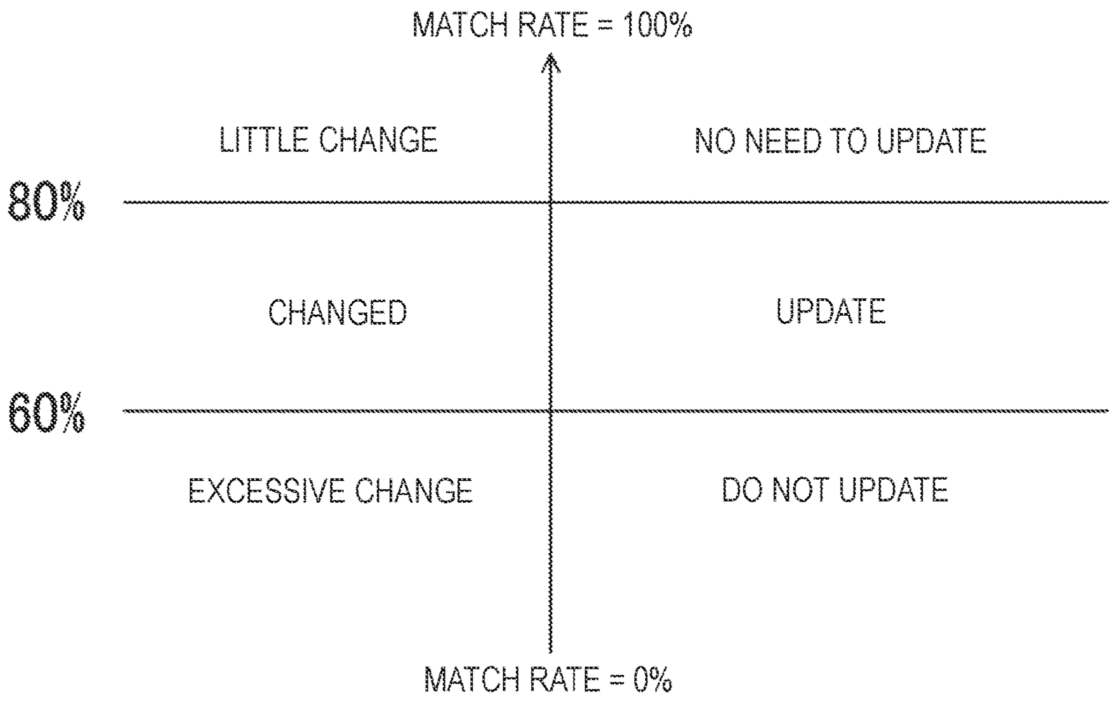
FIG. 11 is a diagram illustrating a relationship between a match rate of feature points in the outside and update.

FIG. 10 is a flowchart illustrating an example of a process for updating a feature point map during automatic parking control. FIG. 11 is a diagram illustrating the relationship between a match rate of feature points and an update of registered feature points.

When the registered parking position image button 62 of the automatic parking menu illustrated in FIG. 4 is operated by touch, the automatic parking control unit 55 starts the process in FIG. 10. In the present example, it is assumed that No. 1-image button 62*a* was operated by touch by the driver of the vehicle 10.

The automatic parking control unit 55 acquires feature points (hereinafter referred to as feature points at execution) related to the current designated parking position from the front camera 12Fr, the rear camera 12Rr, the left side camera 12L, and the right side camera 12R, and calculates a match rate between the acquired feature points at execution and the registered feature points (step S21). Next, the automatic parking control unit 55 determines whether the match rate between the feature points at execution and the registered feature points is 80% or more (step S22).

When the match rate is 80% or more in step S22 (step S22: Yes), that is, when the match rate between the feature points at execution and the registered feature points is 80% or more, the automatic parking control unit 55 determines that there is almost no change in the feature points of the outside at the designated parking position, and as illustrated in FIG. 11, maintains the feature point map representing the registered feature points registered until then in the storage unit 54 as it is, and does not update the feature point map.

When the match rate is not 80% or more in step S22 (step S22: No), the automatic parking control unit 55 determines whether the match rate is 60% or more (step S23). When the match rate is 60% or more in step S23 (step S23: Yes), the automatic parking control unit 55 updates the feature point map representing the registered feature points registered until then to a feature point map representing feature points at execution for the designated parking position designated by the driver (step S24). That is, when the match rate between the feature points at execution and the registered feature points is 60% or more and less than 80%, the automatic parking control unit 55 determines that there is a change in the feature points of the outside at the designated parking position, as illustrated in FIG. 11, and updates the feature point map registered in the storage unit 54 to the current feature point map. Here, the entire feature point map may be updated, or only different feature points in the feature point map may be updated.

When the match rate is not 60% or more in step S23 (step S23: No), as illustrated in FIG. 11, the automatic parking control unit 55 determines that the feature points of the outside at the designated parking position excessively changed, maintains the feature point map representing the registered feature points registered until then in the storage unit 54 as it is, and does not update the feature point map.

In addition to the process illustrated in FIG. 10, the automatic parking control unit 55 appropriately executes automatic parking control such as automatic parking of the vehicle 10 at the designated parking position.

As described above, the automatic parking control unit 55 of the moving body control device registers feature points related to the designated parking position based on the recognition data of the outside as registered feature points, automatically parks the vehicle 10 at the designated parking position based on the recognition data of the outside and the registered feature points, and updates the registered feature points according to the match rate between feature points at execution obtained based on the recognition data of the outside when automatic parking is executed and registered feature points registered until then.

Figure 12:
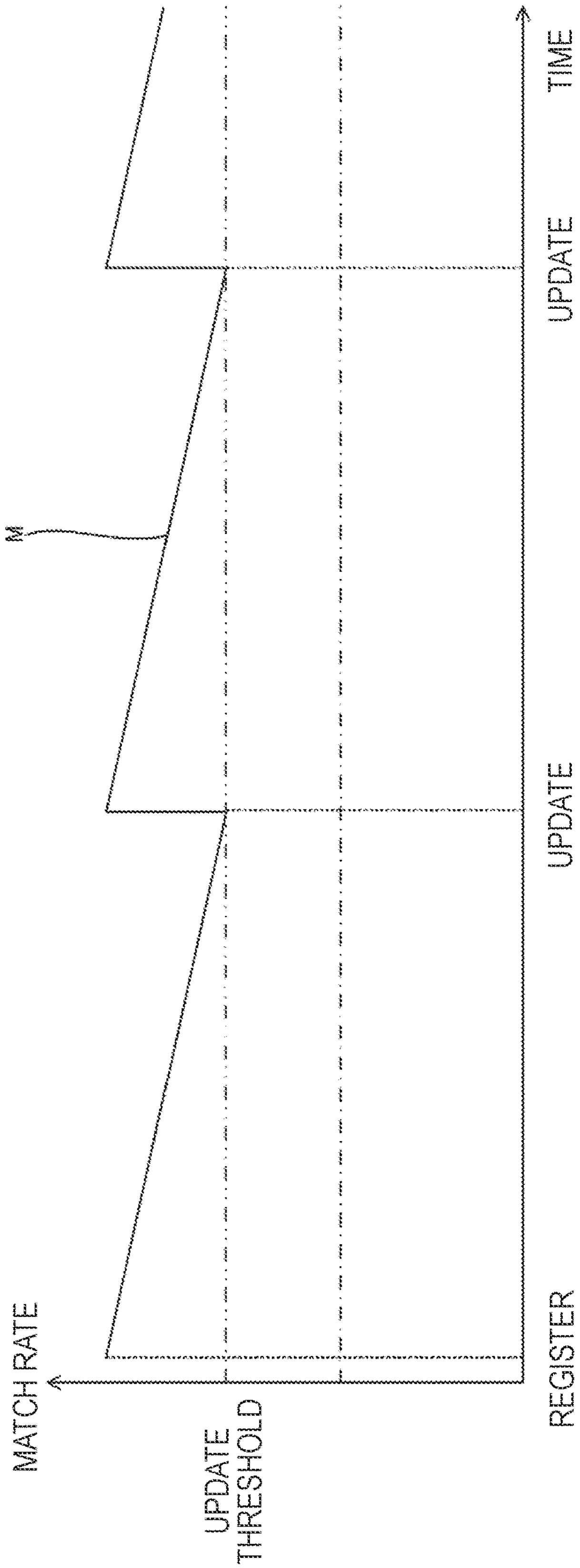
FIG. 12 is a diagram illustrating a match rate of feature points maintained by automatic updating of registered feature points.

According to such configuration, when the registered feature points change due to the passage of time or the like, the registered feature points can be appropriately updated according to the match rate. For example, as illustrated in FIG. 12, when automatic parking of the vehicle 10 at the designated parking position is executed when the match rate between the feature points at execution and the registered feature points is equal to or higher than the update threshold, it is possible to automatically update the registered feature points and maintain a high match rate M. As a result, even when the appearance of buildings and obstacles (plantings) around the designated parking position changes due to the passage of time and seasonal changes, continuous automatic parking control to the designated parking position based on the registered feature points which are updated as appropriate can be enabled.

The automatic parking control unit 55 does not update the registered feature points, when the match rate between the feature points when automatic parking is executed and the registered feature points is equal to or greater than 80%, for example. Then, when the match rate between the feature points when automatic parking is executed and the registered feature points is less than 80% and is 60% or more, the registered feature points are updated. Thus, when the change in the registered feature points is small, the processing amount of the automatic parking control unit 55 is reduced by not updating the registered feature points, and when the change in the registered feature points is large to some extent, the registered feature points are updated and continuous automatic parking control to the designated parking position becomes possible.

Although the embodiment of the present disclosure is described above, the present disclosure is not limited to the above embodiment, and can be modified, improved, and the like as appropriate.

For example, in the above-described embodiment, the case where the vehicle 10 is automatically parked by the automatic steering of the automatic parking control unit 55 was described, but the present disclosure is not limited thereto. For example, the present disclosure may be applied to parking support which assists in parking the vehicle 10 by a driver's operation.

In the above embodiment, the parking position of the vehicle 10, and feature points of the parking position and the surroundings are described using the bird's-eye view image (combined image) by the front camera 12Fr, the rear camera 12Rr, the left side camera 12L, and the right side camera 12R, but the present disclosure is not limited thereto. For example, an image captured by any one of the front camera 12Fr, the rear camera 12Rr, the left side camera 12L, and the right side camera 12R may be used for explanation.

In the above embodiment, the case where the automatic parking control unit 55 displays the bird's-eye view image 71 and the like on the touch panel 42 of the vehicle 10 was described, but the present disclosure is not limited thereto. For example, the automatic parking control unit 55 may display the bird's-eye view image 71 or the like on the display screen of an information terminal (such as a smart phone) possessed by the passenger of the vehicle 10 via the communication unit 24.

In the above embodiment, a case has been described in which the feature point map representing the registered feature points of the designated parking position is registered in the storage unit 54 of the vehicle 10, but the present disclosure is not limited thereto. For example, such information may be registered in a storage unit of another device such as a smart phone or a server which is communicably connected to the vehicle 10.

In the above embodiment, the case in which the user touch-operates the registered parking position image button 62 when parking the vehicle 10 at the registered parking position (selecting and touch-operating the No. 1-image button 62*a* in FIG. 4) was described, but the present disclosure is not limited thereto. For example, when the user touches the automatic parking button 60 displayed on the touch panel 42 to automatically park the vehicle 10, the automatic parking control unit 55 may compare the bird's-eye view image captured when automatic parking is executed with the registered bird's-eye view image to automatically determine a parking position in which the vehicle is to be parked now, and start the process of FIG. 10, for example. Thus, there is no need for the user of the vehicle 10 to find and select the button for the current parking position among the registered parking position image buttons 62.

In the above-described embodiment, an example in which a vehicle (a four-wheeled automobile) is used as the moving body was described, but the present disclosure is not limited thereto. For example, the moving body may be a vehicle such as a two-wheeled vehicle or a Segway. The concept of the present disclosure is not limited to vehicles, but can be applied to robots, ships, aircraft, or the like which are equipped with a driving source and can move by the power of the driving source.

The moving body control method described in the above embodiment can be implemented by executing a prepared moving body control program on a computer. The moving body control program is recorded in a computer-readable storage medium and executed by being read out from the storage medium. The moving body control program may be provided in a form stored in a non-transitory storage medium such as a flash memory, or may be provided via a network such as the Internet. The computer which executes the moving body control program may be included in the moving body control device, or may be included in an electronic device such as a smart phone, tablet terminal, or personal computer which can communicate with the moving body control device, or may be included in a server device which can communicate with the moving body control device and the electronic device.

At least the following matters are described in the specification. Although corresponding components are described in the parenthesis in the above-described embodiment, the present invention is not limited thereto.

(1) A moving body control device including:

an outside recognition unit (the front camera 12Fr, the rear camera 12Rr, the left side camera 12L, and the right side camera 12R) configured to acquire recognition data of an outside of a moving body (vehicle 10);

a reception unit (touch panel 42) configured to receive designation of a predetermined parking position from a user of the moving body; and a control unit (an automatic parking control unit 55) configured to perform automatic parking control for parking the moving body at the predetermined parking position based on the recognition data of the outside and the predetermined parking position, and register the predetermined parking position as a designated parking position, in which the control unit is configured to:

register feature points related to the designated parking position based on the recognition data of the outside as registered feature points, and performs automatic parking control for parking the moving body at the designated parking position based on the recognition data of the outside and the registered feature points; and update the registered feature points according to a match rate between the feature points obtained based on the recognition data of the outside when the automatic parking control is executed and the registered feature points.

According to (1), when the registered feature points change due to seasonal changes or the like, the registered feature points are updated to enable continuous automatic parking control to the designated parking position.

(2) The moving body control device according to (1), in which the control unit is configured:

not to update the registered feature points when the match rate is equal to or greater than a first threshold; and to update the registered feature points when the match rate is less than the first threshold.

According to (2), when the change in the registered feature points is small, the processing amount is reduced by not updating the registered feature points, and when the change in the registered feature points is large, the registered feature points are updated and continuous automatic parking control to the designated parking position becomes possible.

(3) The moving body control device according to (2), in which the control unit is configured not to update the registered feature points, when the match rate is less than a second threshold which is lower than the first threshold, even when the match rate is less than the first threshold.

According to (3), when the change in the registered feature points is excessively large, such as temporary heavy snowfall, the registered feature points are not updated so that continuous automatic parking control to the designated parking position in normal times becomes possible. When there is a possibility that the parking position where the driver is currently trying to park may differ from the designated parking position which is registered, by not updating the registered feature points, it is possible to prevent a situation in which registration feature points are erroneously updated.

(4) A moving body control method including a processor of a moving body control device, in which the processor of the moving body control device is configured to:

acquire recognition data of an outside of a moving body;

receive designation of a predetermined parking position from a user of the moving body;

perform automatic parking control for parking the moving body at the predetermined parking position based on the recognition data of the outside and the predetermined parking position, and register the predetermined parking position as a designated parking position;

register feature points related to the designated parking position based on the recognition data of the outside as registered feature points, and perform the automatic parking control for parking the moving body at the designated parking position based on the recognition data of the outside and the registered feature points; and update the registered feature points according to a match rate between the feature points obtained based on the recognition data of the outside when the automatic parking control is executed and the registered feature points.

According to (4), when the registered feature points change due to seasonal changes or the like, the registered feature points are updated to enable continuous automatic parking control to the designated parking position.

(5) A moving body control program causing a processor of a moving body control device to execute a process of:

acquiring recognition data of an outside of a moving body;

receiving designation of a predetermined parking position from a user of the moving body;

performing automatic parking control for parking the moving body at the predetermined parking position based on the recognition data of the outside and the predetermined parking position, and registering the predetermined parking position as a designated parking position;

registering feature points related to the designated parking position based on the recognition data of the outside as registered feature points, and performing the automatic parking control for parking the moving body at the designated parking position based on the recognition data of the outside and the registered feature points; and updating the registered feature points according to a match rate between the feature points obtained based on the recognition data of the outside when the automatic parking control is executed and the registered feature points.

According to (5), when the registered feature points change due to seasonal changes or the like, the registered feature points are updated to enable continuous automatic parking control to the designated parking position.

What is claimed is:

1. A moving body control device comprising a processor configured to:

acquire recognition data of an outside of a moving body;

receive designation of a predetermined parking position from a user of the moving body via an input device of the moving body;

detect a feature point map including a plurality of feature points from the recognition data of the outside;

perform automatic parking control for parking the moving body at the predetermined parking position based on the recognition data of the outside and the predetermined parking position, and register the predetermined parking position as a designated parking position;

register the feature point map including feature points related to the designated parking position based on the recognition data of the outside as registered feature points, and perform the automatic parking control for parking the moving body at the designated parking position based on the recognition data of the outside and the registered feature points; and determine whether to update the registered feature points according to a match rate between feature points at execution that are the feature map including the feature points obtained based on the recognition data of the outside during the automatic parking control is executed and the registered feature points.

2. The moving body control device according to claim 1, wherein the processor is configured:

not to update the registered feature points when the match rate is equal to or greater than a first threshold; and to update the registered feature points when the match rate is less than the first threshold.

3. The moving body control device according to claim 2, wherein the processor is configured not to update the registered feature points, when the match rate is less than a second threshold which is lower than the first threshold, even when the match rate is less than the first threshold.

4. A moving body control method including a processor of a moving body control device, wherein the processor of the moving body control device is configured to:

acquire recognition data of an outside of a moving body;

receive designation of a predetermined parking position from a user of the moving body;

detect a feature point map including a plurality of feature points from the recognition data of the outside;

perform automatic parking control for parking the moving body at the predetermined parking position based on the recognition data of the outside and the predetermined parking position, and register the predetermined parking position as a designated parking position;

register the feature point map including feature points related to the designated parking position based on the recognition data of the outside as registered feature points, and perform the automatic parking control for parking the moving body at the designated parking position based on the recognition data of the outside and the registered feature points; and determine whether to update the registered feature points according to a match rate between feature points at execution that are the feature map including the feature points obtained based on the recognition data of the outside during the automatic parking control is executed and the registered feature points.

5. A non-transitory computer-readable storage medium storing a moving body control program causing a processor of a moving body control device to execute a process of:

acquiring recognition data of an outside of a moving body;

receiving designation of a predetermined parking position from a user of the moving body;

detecting a feature point map including a plurality of feature points from the recognition data of the outside;

performing automatic parking control for parking the moving body at the predetermined parking position based on the recognition data of the outside and the predetermined parking position, and registering the predetermined parking position as a designated parking position;

registering the feature point map including feature points related to the designated parking position based on the recognition data of the outside as registered feature points, and performing the automatic parking control for parking the moving body at the designated parking position based on the recognition data of the outside and the registered feature points; and determining whether to update the registered feature points according to a match rate between feature points at execution that are the feature map including the feature points obtained based on the recognition data of the outside during the automatic parking control is executed and the registered feature points.

6. A moving body control device comprising a processor configured to:

acquire recognition data of an outside of a moving body;

receive designation of a predetermined parking position from a user of the moving body via an input device of the moving body;

perform automatic parking control for parking the moving body at the predetermined parking position based on the recognition data of the outside and the predetermined parking position, and register the predetermined parking position as a designated parking position;

register feature points related to the designated parking position based on the recognition data of the outside as registered feature points, and perform the automatic parking control for parking the moving body at the designated parking position based on the recognition data of the outside and the registered feature points; and determine whether to update the registered feature points according to a match rate between the feature points obtained based on the recognition data of the outside during the automatic parking control is executed and the registered feature points, wherein a first threshold and a second threshold are set for the match rate, the processor is further configured to update the registered feature points, when the match rate is less than the first threshold and is equal to or greater than the second threshold, and the processor is configured not to update the registered feature points, when the match rate is less than the second threshold.

7. The moving body control device according to claim 1, wherein the processor is configured to perform registration control to register feature points related to the designated parking position based on the recognition data of the outside, and the automatic parking control based on the recognition data of the outside and the registered feature points registered in the recognition control, and the match rate is a match rate between the feature points at execution obtained based on the recognition data of the outside during executing the automatic parking control and the registered feature points.

8. The moving body control device according to claim 6, wherein the processor is configured to perform registration control to register feature points related to the designated parking position based on the recognition data of the outside, and the automatic parking control based on the recognition data of the outside and the registered feature points registered in the recognition control, and the match rate is a match rate between the feature points at execution obtained based on the recognition data of the outside during executing the automatic parking control and the registered feature points.

9. The moving body control device according to claim 6, wherein the processor is configured:

not to update the registered feature points when the match rate is equal to or greater than a first threshold; and to update the registered feature points when the match rate is less than the first threshold.

* * * * *